United States Patent [19]

Castilla

[11] Patent Number: 4,799,609
[45] Date of Patent: Jan. 24, 1989

[54] PORTABLE LUGGAGE CARRIER FOR AUTOMOBILES

[76] Inventor: Antonio J. Castilla, 3343 Lanarc, Plano, Tex. 75023

[21] Appl. No.: 141,405

[22] Filed: Jan. 4, 1988

[51] Int. Cl.$^4$ .............................................. B60R 9/06
[52] U.S. Cl. ............................ 224/42.07; 224/42.08; 224/42.43
[58] Field of Search .......... 224/42.07, 42.43, 42.03 R, 224/42.03 A, 42.08, 42.44, 42.06; 280/769

[56] References Cited

U.S. PATENT DOCUMENTS

| | | | |
|---|---|---|---|
| 1,640,779 | 8/1927 | Laher | 224/42.07 |
| 2,541,244 | 2/1951 | Hack | 224/42.07 |
| 3,521,799 | 7/1970 | Rundel | 224/42.07 |
| 3,690,526 | 9/1972 | Rundel | 224/42.07 |
| 3,822,801 | 7/1974 | Morgan, Jr. | 224/42.08 |

FOREIGN PATENT DOCUMENTS

| | | | |
|---|---|---|---|
| 3524283 | 2/1986 | Fed. Rep. of Germany | 224/42.03 R |
| 557139 | 10/1922 | France | 224/42.08 |
| 351851 | 3/1961 | Switzerland | 224/42.07 |

Primary Examiner—Renee S. Luebke
Attorney, Agent, or Firm—Warren H. Kintzinger

[57] ABSTRACT

A light weight and collapsible luggage carrier that hooks onto the rear car bumper with adjustable length support chains with end brackets mounting on a trunk rim. The luggage carrier comes in kit form that when collapsed is conveniently stored in the car trunk available for use when needed. The carrier assembled in place on the rear of an automobile includes a "U" shaped tubular metal assembly in the luggage carrier along a plurality of cross tubes as a platform support for luggage carried thereon. Rubber bumpers on the front ends of the "U" sides prevent damage to the auto rear above the rear bumper. Two opposite side support plastic sheathed chains have metal end clips that hook over the trunk rear rim and extend to exposed chain outer ends selectively connected by "S" hooks to opposite ends of the "U" shape adjacent flattened bends that prevent the "S" hooks from moving through the flattened bends. An additional plastic sheath enclosed chain extends from a hook connection to the bottom of the rear bumper to a "S" hook connection to the middle of the rear "U" tubular member.

10 Claims, 2 Drawing Sheets

PORTABLE LUGGAGE CARRIER FOR AUTOMOBILES

BACKGROUND OF THE INVENTION

This invention relates in general to vehicle luggage carrying racks, and more particularly, to a portable, light, easy to assemble and mount and to disassemble luggage carrier for automobiles mountable at the rear of an automobile.

There are many times that the trunk of an automobile will not accommodate all the luggage that must be taken along on a trip. Various luggage racks that have been made in the past to mount on the rear of an automobile are too complex, hard to use and at times not structurally adequate to the job required in carrying luggage over long distances.

It is therefore a principal object of this invention to provide a portable automobile luggage carrier in kit form that is light, easy to assemble and mount and easy to disassemble for compact storage in the car trunk or elsewhere.

Another object is to provide such a portable automobile luggage carrier that is adequately structurally sound for the purpose intended.

A further object for such a luggage carrier is to be relatively inexpensive while being a light structurally strong baggage rack.

Still another object is to provide such a luggage carrier rack that is easily mounted on the rear of a car without damage to the car.

SUMMARY OF THE INVENTION

Features of the invention useful in accomplishing the above objects include, in a portable luggage carrier for automobiles, a light weight and collapsible luggage carrier that hooks onto the rear car bumper with adjustable length support chains with end brackets mounting on a trunk rim. The luggage carrier comes in kit form that when collapsed is conveniently stored in the car trunk available for use when needed. The carrier assembled in place on the rear of an automobile includes a "U" shaped tubular metal assembly in the luggage carrier along with a plurality of cross tubes as a platform support for luggage carried thereon. Rubber bumpers on the front ends of the "U" sides prevent damage at the auto rear above the rear bumper. Two opposite side support plastic sheathed chains have metal end clips that hook over the trunk rear rim and extend to exposed chain outer ends selectively connected by "S" hooks to opposite ends of the "U" shaped tubular member adjacent flattened bends that prevent the "S" hooks from moving through the flattened bends. An additional plastic sheath enclosed chain extends from a hook connection to the bottom of the rear bumper to a "S" hook connection to the middle of the rear "U" tubular member. The "U" shaped tubular metal assembly has a tubular rear member extended to and through the flattened and bent ends to stub socket extensions into which opposite side tubular members extend. Bolts extend through opposite ends of a cross tube, the stub ends of the tubular rear member and the ends of opposite side tubular members extended into the stub ends of the tubular rear member.

A specific embodiment representing what is presently regarded as the best mode of carrying out the invention is illustrated in the accompanying drawings.

In the drawings:

FIG. 1 represents a partial perspective view of the portable luggage carrier mounted on the rear of an automobile;

FIG. 2, a partial cut and sectioned view taken along line 2—2 of FIG. 1 showing cross, tube, rear member and opposite side tubular member interconnect detail;

FIG. 3, a side elevation of the portable luggage carrier mounted on the rear of an automobile as seen from line 3—3 of FIG. 1; and, FIG. 4, a partially assembled partially exploded view of the tubular framed metal platform of the luggage carrier for automobiles.

Referring to the drawings:

DETAILED DESCRIPTION OF THE INVENTION

Figure 1:
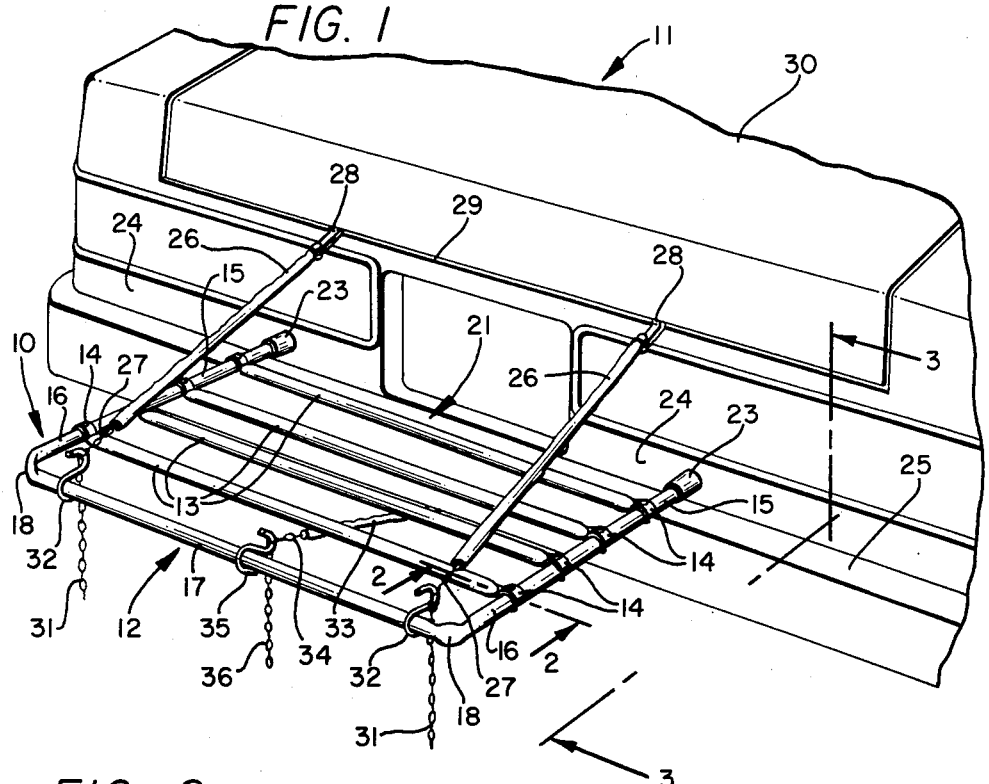
Figure 2:
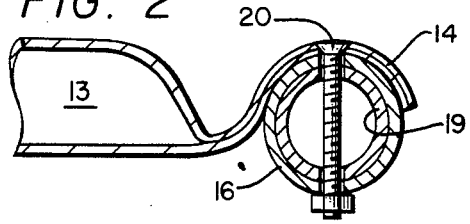
Figure 3:
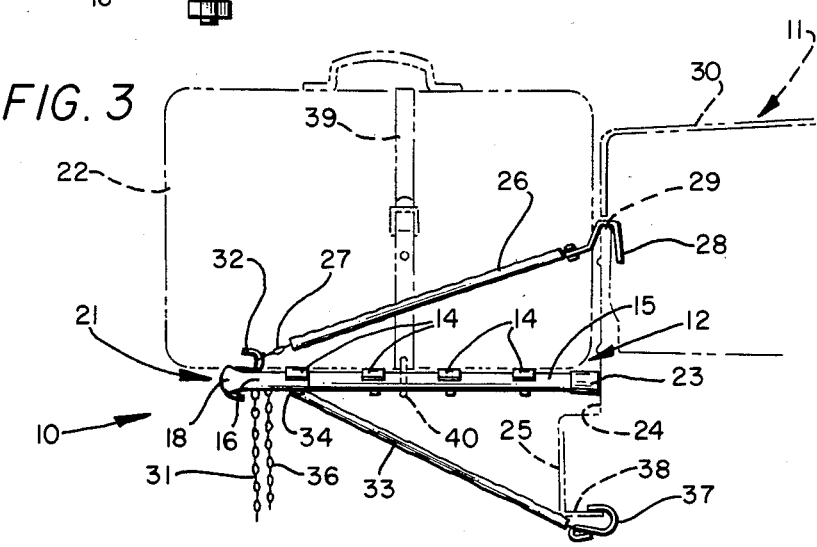
Figure 4:
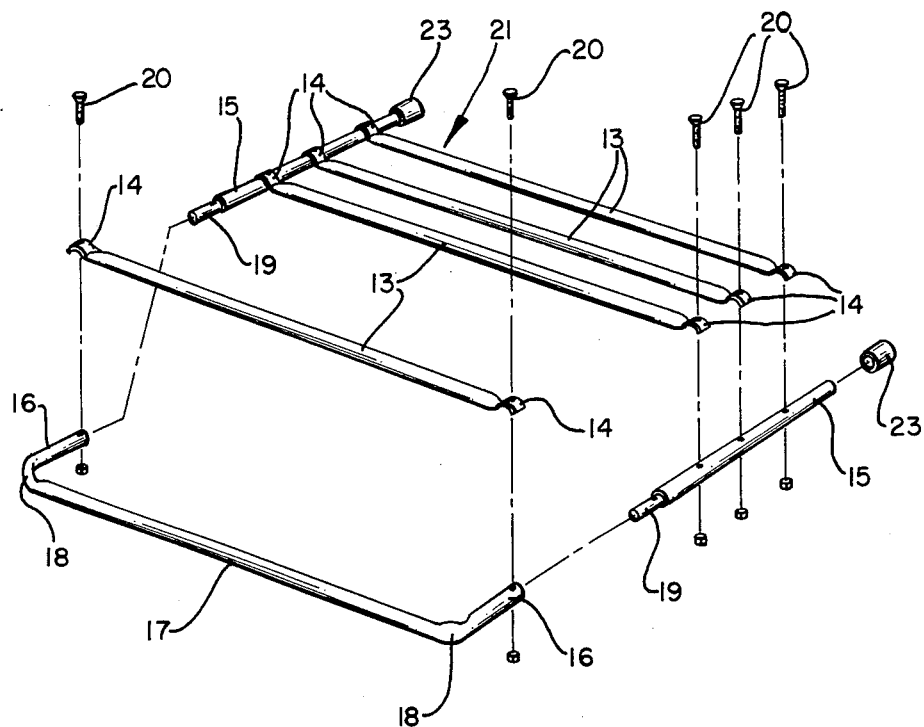

The portable luggage carrier 10 for automobiles 11 of FIGS. 1-4 is shown in FIGS. 1 and 3 to be mounted on the rear of an automobile 11 extending to the rear therefrom. The luggage carrier 10 comes in kit form that in the collapsed state is conveniently stored in the car trunk available for use when needed. The carrier 10 assembled in place on the rear of an automobile 11 includes a "U" shaped tubular metal assembly 12 in the luggage carrier 10 with four cross tubes 13 having flattened and curved over opposite ends 14 to fit over opposite side tubular members 15 of the "U" shaped tubular metal assembly 12 with the rearmost cross tube 13 opposite ends 14 fitting over tubular stub socket extensions 16 of "U" shaped tubular rear member 17 that extends transversely across to and through flattened and bent ends 18 to tubular stub socket extensions 16 into which reduced diameter end extensions 19 of tubular member 15 extend. Bolts 20 extend through opposite ends 14 of the rearmost cross tube 13, the tubular stub socket extensions 16 and the end extensions 19 of tubular members 15 to hold the "U" shaped assembly 12 together. Additional bolts 20 extend through opposite ends 14 of the other cross tubes 13 and the opposite side tubular members 15 to hold them in the assembled state as the generally coplanar carrier platform 21 that supports luggage 22 carried thereon. Rubber (or plastic) resilient pad bumpers 23 are mounted on the forward ends of opposite side tubular members 15 to prevent damage to the auto rear 24 that they engage above rear bumper 25.

Two opposite side support plastic sheathed 26 chains 27 have forward end flat strap metal clips (or hooks) 28 that hook over the rear rim 29 of the car trunk 30. The chains 27 extend to exposed chain over rear ends 31 connected by selective length positioned "S" hooks 32 to "U" shaped tubular rear member 17 adjacent flattened bends 18. These bends 18 are sufficiently wide as to prevent "S" hooks 32 fromm moving into the flattened bends 18. An additional plastic sheathed 33 chain 34 extends from an "S" hook 35 connection, between the chain exposed chain rear end 36 and middle of the "U" shaped tubular rear member 17, and a front hook 37 connection to the bottom 38 of the rear bumper 25.

One or two adjustable length straps 39 with carrier platform 21 fastening opposite end "S" hooks 40 are provided for use in holding luggage 22 in place on the platform 21 of the luggage carrier 10. The luggage carrier 10 shown and described is a light weight yet strong, efficient carrier of luggage 22 that may be easily and quickly disassembled to a relatively small compact state easily stored in the car trunk or elsewhere and easily and quickly reassembled for luggage 22 carrying use when required. The tubular structural members of the carrier 10 may be made of aluminum or a suitable plastic material capable of withstanding the stress and strain of luggage 22 carrying with travel of a vehicle over extended period of time.

Whereas this invention has been described with respect to a single embodiment thereof, it should be realized that various changes may be made without departing from the essential contributions to the art made by the teachings hereof.

I claim:

1. A luggage carrier for automobiles that fastens to the car trunk rear rim and the car rear bumper comprising: a generally coplanar carrier platform including a "U" shaped tubular assembly along with a plurality of cross tubes extended between and fastened to opposite side legs of the "U" shaped tubular assembly; resilient bumper pads mounted on front ends of the opposite side legs of the "U" shaped tubular assembly; a plurality of chain elements having forward end hooks that hook over a car trunk rear end rim and hook means connecting chain outer end sections to the rear tubular element of said "U" shaped tubular assembly; and an additional chain length having a front hook connectable to the bottom of said car rear bumper and a rear hook for connection to said rear tubular element of said "U" shaped tubular metal assembly.

2. The luggage carrier for automobiles of claim 1, wherein said "U" shaped tubular assembly has said rear tubular element formed with opposite side flattened bends terminating in tubular stub sections; said opposite side legs each connected via a stub and tubular socket interconnect with said tubular stub sections in said "U" shaped tubular assembly; and with bolt assemblies extended through opposite ends of one of said plurality of cross tubes also extended through each of said stub and tubular socket interconnects.

3. The luggage carrier for automobiles of claim 2, wherein said plurality of cross tubes each have flattened and curved over opposite ends that fit over and conform to the top of the tubing at opposite sides of said "U" shaped tubular assembly; and with bolt assemblies extended through each end of each of said plurality of cross tubes and through tubing at opposite sides of said "U" shaped tubular assembly.

4. The luggage carrier for automobiles of claim 3, wherein said forward end hooks are formed from flat metal strips so that the trunk lid may be closed even though said forward end hooks are hooked over the car trunk rear rim.

5. The luggage carrier for automobiles of claim 4, wherein said hooks means are "S" hooks having openings on the "S" hooks fastened to the rear tubular element of said "U" shaped tubular assembly that are smaller than the opposite side flattened bends that block movement of the "S" hooks into the opposite side flattened bends.

6. The luggage carrier for automobiles of claim 5, wherein said plurality of chain elements are two opposite side chains fastened to the rear tubular element of said "U" shaped tubular assembly adjacent to and inboard from said opposite side flattened bends.

7. The luggage carrier for automobiles of claim 6, wherein adjustable length belt means with "S" hook terminations is useable to hold luggage in place on said carrier platforms.

8. The luggage carrier for automobiles of claim 5, wherein each of said plurality of chain elements has a plastic sheath extending from adjacent said forward end hooks to exposed chain outer rear ends.

9. The luggage carrier for automobile of claim 7, wherein said additional chain length has a plastic sheath extending from adjacent said front hook to an exposed chain outer rear end.

10. The luggage carrier for automobiles of claim 9, wherein the exposed chain outer rear end of said additional chain length is connected by a "S" hook to the mid portion of the rear tubular element of said "U" shaped tubular assembly.

* * * * *